United States Patent
Briongos

(10) Patent No.: US 11,907,371 B2
(45) Date of Patent: Feb. 20, 2024

(54) MICROARCHITECTURAL ATTACKS DETECTION MECHANISM FOR TRUSTED EXECUTION ENVIRONMENTS

(71) Applicant: NEC Laboratories Europe GmbH, Heidelberg (DE)

(72) Inventor: Samira Briongos, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 289 days.

(21) Appl. No.: 17/378,808

(22) Filed: Jul. 19, 2021

(65) Prior Publication Data
US 2022/0284098 A1    Sep. 8, 2022

(30) Foreign Application Priority Data
Mar. 4, 2021   (EP) ..................... 21160755

(51) Int. Cl.
*G06F 21/00*   (2013.01)
*G06F 21/56*   (2013.01)
*G06F 21/53*   (2013.01)

(52) U.S. Cl.
CPC ............ *G06F 21/566* (2013.01); *G06F 21/53* (2013.01); *G06F 2221/034* (2013.01)

(58) Field of Classification Search
CPC .. G06F 21/566; G06F 21/53; G06F 2221/034; G06F 2201/88; G06F 2201/86; G06F 9/5027; G06F 21/57; G06F 11/0721; G06F 11/3612; G06F 11/3636; G06F 13/12; G06F 11/2236; G06F 11/3024; G06F 2201/885
See application file for complete search history.

(56) References Cited

U.S. PATENT DOCUMENTS 11,687,361 B1 *   6/2023   Holub ................... G06F 9/5038
                                                              718/100

OTHER PUBLICATIONS

Disselkoen—NPL 2 (Year: 2017).*
Jiang, Jianyu et al. "Monitoring Performance Metrics is not Enough to Detect Side-Channel Attacks on Intel SGX," arXiv:2011.14599v1, Nov. 30, 2020, Arxiv, US, pp. 1-15.
Liu, Fangfei et al. "Last-Level Cache Side-Channel Attacks are Practical," In *Proceedings of the 2015 IEEE Symposium on Security and Privacy (SP '15)*, May 17-21, 2015, IEEE, US, pp. 605-622.

* cited by examiner

*Primary Examiner* — Tri M Tran
(74) *Attorney, Agent, or Firm* — Leydig, Voit & Mayer, Ltd.

(57) ABSTRACT

A method for detecting a microarchitectural attack on a trusted execution environment (TEE) and/or a violation of an expected execution flow of an application running in the TEE includes implementing a counting thread. An eviction set is loaded in a transaction. The eviction set corresponds to a cache set used by an operation of the application such that a transactional abort is received upon the operation being executed. A value of the counting thread is read upon receiving the transactional abort. These steps are repeated for a next operation of the application running in the TEE and an execution time is measured for the operation based on a difference between the values of the counting thread. The measured execution time for the operation is compared with an expected execution time to detect one or more variations that indicate the microarchitectural attack and/or the violation of the expected execution flow.

15 Claims, 3 Drawing Sheets

MICROARCHITECTURAL ATTACKS DETECTION MECHANISM FOR TRUSTED EXECUTION ENVIRONMENTS

CROSS-REFERENCE TO RELATED APPLICATION

Priority is claimed to European Patent Application No. EP 21160755, filed on Mar. 4, 2021, the entire disclosure of which is hereby incorporated by reference herein.

FIELD

The present invention relates to a method, system and computer-readable medium for detecting microarchitectural attacks targeting an application running in a trusted execution environment (TEE).

BACKGROUND

A TEE (which can also be referred to as an "enclave") offers an execution space that provides a high level of security and privacy for applications. Typically, a TEE provides security features such as integrity of applications and confidentiality of the application's assets. Many of today's TEEs are realized by dedicated, protected parts of a central processing unit (CPU), including the computer's caches and main memory, which is isolated and encrypted. A prominent example of a TEE is provided by INTEL Software Guard Extensions (SGX) and is referred to as an enclave. Victor Costan, et al., "Intel SGX Explained," Cryptology ePrint Archive, Report 2016/086 (2016), which is hereby incorporated by reference herein, describe SGX in great detail, with section 5 providing an overview of using SGX from a programmer's perspective, and also overview other trusted execution environments. In particular, TEEs, such as the enclaves in SGX, enable applications to run in isolation from any other software on the same platform. Furthermore, applications running in TEEs benefit from encrypted and authenticated storage (also referred to by the term "sealing") and cryptographic mechanisms (also referred to by the term "remote attestation") that allow remote third parties to verify the software configuration of the application running in the TEE.

SGX offers hardware-based isolation to trusted applications that run in the so-called enclaves. Enclave isolation leverages dedicated, hardware-protected memory and prevents access to this memory from any processes running at higher privilege levels, including the operating system (OS) or the hypervisor. SGX also allows enclaves to store encrypted and authenticated data to disk by means of a sealing process. Further, SGX offers the remote attestation mechanism that allows remote third parties to verify if an application is running inside an enclave and that the software running inside the enclave is the expected software.

SUMMARY

In an embodiment, the present invention provides a method for detecting a microarchitectural attack on a trusted execution environment and/or a violation of an expected execution flow of an application running in the trusted execution environment. The method includes, in a step a), implementing a counting thread that increments a counter variable at each cycle of a central processing unit on which the trusted execution environment is running. In a step b), an eviction set is loaded in a transaction. The eviction set corresponds to a cache set used by an operation of the application running in the trusted execution environment such that a transactional abort is received upon the operation being executed. In a step c), a value of the counting thread is read upon receiving the transactional abort. In a step d), steps b) and c) are repeated for a next operation of the application running in the trusted execution environment. In a step e), an execution time is measured for the operation based on a difference between the values of the counting thread. In a step f), the measured execution time for the operation is compared with an expected execution time to detect one or more variations that indicate the microarchitectural attack and/or the violation of the expected execution flow of the application.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
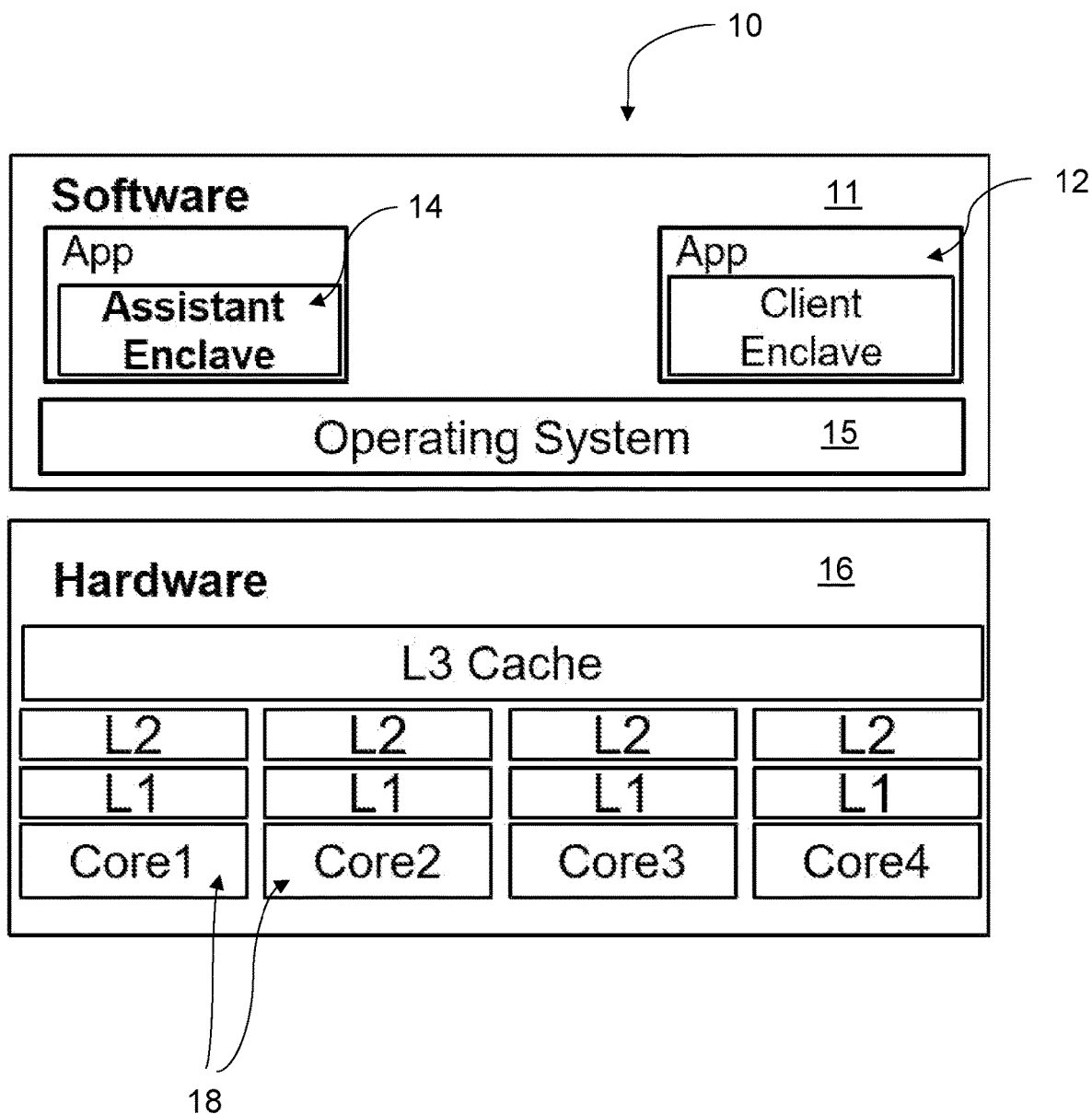
FIG. 1 schematically illustrates a system architecture and model according to an embodiment of the present invention.

Embodiments of the present invention enable one assistant TEE to detect a microarchitectural attack targeting another application running on a different TEE (also referred to as a protected TEE or client TEE) on the same host by the assistant TEE leveraging transactional memory and measuring the execution time of different code fragments of the client TEE. Increments on the execution times are indicative of attacks. In other words, by measuring execution times and determining that they are longer than expected execution times, attacks can be detected and prevented.

Microarchitectural attacks can break all the security assumptions of TEEs by exploiting the information gained from the changes in the microarchitectural components state, due to the unavoidable interaction of the software with the hardware. In general, the term microarchitecture in this context refers to the hardware implementation of an Instruction Set Architecture (ISA). Accordingly, microarchitectural components or elements are the hardware components or the hardware circuitry present in the central processing unit (CPU), for example, cache memories, translation lookaside buffers (TLBs) or other buffers. As an example, the cache memory is particularly interesting for attackers since it allows to gain accurate and high resolution information about a victim TEE. However, it is not the only channel that an attacker can exploit to learn the secrets of a TEE. Additionally, an attacker could exploit page faults, interruptions, TLBs, several internal buffers, etc. Further, since SGX includes privileged attackers with substantial control of the microarchitecture on its thread model (e.g., the OS), it allows much more powerful microarchitectural attacks that can leak the enclave secrets in just milliseconds and/or using only one single execution of the victim enclave.

For these reasons, and since only the code inside the enclave can be trusted, there are many proposals that embed detection countermeasures on the enclave, and aim to detect anomalous behaviors on the execution of the enclave. All of these existing proposals assume that an attacker tries to infer as much information as possible from the victim enclave in as few rounds as possible, and therefore, the existing proposals assume that the changes enforced in the execution of the victim enclave are significant (e.g., the execution time of the victim enclave increases ×10). As a result, the existing proposals fail to detect an attack that leaks small portions of the enclave secrets per execution of the victim enclave (see Jiang, Jianyu, et al., "Monitoring Performance Metrics is not Enough to Detect Side-Channel Attacks on Intel SGX," arXiv:2011.14599v1 [cs.CR] (Nov. 20, 2020), which is hereby incorporated by reference herein). On top of that, the existing proposals introduce huge overheads on the protected applications compared to solutions according to embodiments of the present invention. For example, one alternative approach would be to add a counting thread inside the protected enclave and to instrument its code. However, this would mean that the execution of the protected enclave needs to be interrupted for each measurement. This increases the execution time of the victim and also requires the enclave programmer to modify the application.

Embodiments of the present invention enable the client TEE to detect even the smallest leakage by relying on an assistant TEE to do monitoring and analysis tasks, which also advantageously effectively reduces the runtime overhead introduced by this countermeasure on the client TEE. This is achieved not only in that the client TEE can execute its normal operation flow without change, but also because the security measure through the assistant TEE does not interrupt nor interact directly with the client TEE. Further, there is minimal burden caused to the programmer since the programmer just needs to indicate the regions of the code that need protection and is no burden on the programmer to monitor the whole execution of the enclave's code. Even further, any overhead introduced which depends on the amount of interference on the microarchitectural resources shared between the client and the assistant enclave, and may vary based on the protected application, is also minimized. This interference should be as low as possible so the client TEE could execute faster and it would depend on the protected applications to some extent.

Also, as discussed above, there is no existing mechanism that is able to detect fragmented microarchitectural attacks aimed at leaking secrets of a TEE. Thus, embodiments of the present invention further enhance the security of TEEs running applications in the protected parts of the CPU to protect against attacks which could not be detected by existing approaches. Further, embodiments of the present invention store information in physical memory accessible to the assistant TEE referring to all the previous executions of the protected TEE, and are therefore well suited to estimate the total leakage regardless of the instant when it happened. Moreover, since embodiments of the present invention monitor the state of the client TEE concurrently with its execution, the client TEE can be notified that it is being attacked if consecutive anomalies on its execution times are observed before the client TEE finishes its execution.

In contrast to existing proposals that use assistant enclaves for pure logical tasks, such as maintaining a counter to ensure the freshness of the sealed data, embodiments of the present invention use hardware features, and in particular transactional memory, to accurately monitor the actual execution of a client TEE. A proper use of transactional memory enables embodiments of the invention to mark some kind of breakpoints on the client TEE's application that are used to collect runtime timing information without interrupting the client TEE. Attacks increase the execution time of their victims. Embodiments of the present invention are able to detect the attacks by detecting changes in the execution times of each fragment of the code and further are able to detect the concrete instant and part of the code where the leakage may have taken place. Accordingly, embodiments of the present invention, in addition to providing enhanced security, are able to avoid increased execution time by avoiding the attacks.

Embodiments of the present invention ensure that even the smallest change infringed on the execution of a client TEE will be detected and registered by the assistant TEE. Any microarchitectural attack alters the normal execution flow of the enclave primarily by increasing the time it takes for the TEE to execute certain operations in order to gain information from it. Therefore, by accurately measuring the time each operation takes to execute, it is possible to detect these anomalies and trigger an alarm once the leaked data exceeds some threshold.

In particular, the assistant TEE leverages the transactional memory to measure the time it takes the client TEE to execute predefined portions of its code. Transactional memory enables to define transactions, which are, in particular, code regions that are executed assuming that there is no conflict with other threads or CPU cores, and revert the changes made if a conflict (which makes the transaction abort) is detected. There are various reasons why a transaction may abort, one of them is that any data used during the transaction is evicted from the level 3 (L3) cache. Consequently, if the assistant TEE fills one cache set that the client TEE is going to use within a transaction, the assistant TEE gets a notification every time the client uses the cache set by means of the transaction abort.

Embodiments of the present invention use information about at least two memory locations that the protected TEE will be using to have a measurement reference, as well as an expected elapsed time between accesses to these memory locations to compare with, every time the protected TEE executes one function or operation. For example, if there is one operation OP that uses memory locations A, B, C . . . Z consecutively at times ta, tb, tc . . . tz, the execution time of OP can be approximated as tz–ta, and the assistant TEE monitors locations A and Z to determine when they are executed, and as a consequence, determines the execution time of such operation.

Embodiments of the present invention advantageously use the transactional memory to improve concurrency control mechanisms by allowing a group of instructions to execute atomically, i.e. either the execution of all the instructions finishes or the "transaction" (this code executed atomically) aborts and has to be executed again avoiding the use of locks. Some processors implement this transactional memory in hardware, and then the transactions can be defined using corresponding instructions. Accordingly, a transaction can be considered to be any code that is marked out with these instructions. Transactions are enabled on the assistant TEE using the transactional memory, and operations can be considered to be the instructions/code executed by the client TEE that the assistant TEE will detect using the transactions. The operations of the client TEE to be monitored are also referred to herein as functions.

In embodiments of the present invention, TEEs are installed on network-enabled devices such as smartphones, tablets, laptops, personal computers or servers, for example, remotely located or running in the cloud. Applications consisting of software code are executed in the secure TEEs running on the devices. The terms TEE and enclave, as well as secure environment, trusted space or trusted container, refer to areas running on machines/devices which are able to execute code in isolation from the rest of the software running on the same machine/device.

For the current version of SGX, protected memory is reserved at the start time of an enclave. Memory management, however, may vary between TEEs and even their versions. For example, for SGX, sections 5.2 and 5.3 of the above-referenced paper by Victor Costan, et al. describe the creation and the initialization of an enclave, and the memory management, using particular CPU instructions for setting up the enclave. In SGX, each enclave has its own (virtual) protected memory (ELRANGE), which must be fixed when creating the enclave (ECREATE instruction). The code that runs inside the enclave must be copied from unprotected memory to protected memory via the EADD instruction. This code can then allocate protected memory (within the reserved memory ELRANGE) when it runs. This code should be checked after it is copied into the protected memory and before it runs (remote attestation, see sections 3.3 and 5.8 of the above-referenced paper by Victor Costan, et al.). Further, SGX has the physical protected memory called enclave page cache (EPC), which is referred to herein also as "the fast protected memory," which is reserved at boot time with a limit of 128 MB. Pages can be swapped in and out of the EPC. The swapping must be supported by the operating system as discussed in section 5.5 of the above-referenced paper by Victor Costan, et al. The EPC is shared between all enclaves. The CPU can make sure that an enclave only accesses EPC parts which contain data from the enclave. Setting up the TEE may also include the configuration of the code that runs in the TEE, such as choosing a strategy for swapping segments between protected and unprotected memory. The strategy can also be fixed within the code.

Additional information about attestation for SGX enclaves as an example of a TEE can be found in Scarlata, Vinnie et al., "Supporting Third Party Attestation for INTEL SGX with INTEL Data Center Attestation Primitives," INTEL CORPORATION (2018), which is hereby incorporated by reference herein. Remote attestation is standard and may differ between different TEEs. A key feature of remote attestation is the measurement of the initially loaded code and data to the TEE. This measurement usually comprises a hash of the loaded binary and data, which is checked against a previously registered hash. Typically, there are multiple components involved in the attestation (e.g., the enclave, the application of the enclave, a verifier, and an attestation service). An example of attestation for enclaves is provided in Anati, Ittai, et al., "Innovative Technology for CPU Based Attestation and Sealing," INTEL CORPORATION (2013), which is hereby incorporated by reference herein. The TEE, e.g., INTEL SGX, supports enclave attestation via its hardware instructions. Attestation for enclaves allows to assert trustworthiness of an enclave by verifying enclave identity and an enclave report. At its initialization (launching phase), two enclave identities, e.g., MRENCLAVE and MRSIGNER, are created. MRENCLAVE is a SHA-256 value of enclave code, data and other measurements when the enclave is built. MRSIGNER is the second enclave identity which includes sealing authority (an entity that signs the enclave). The two enclave identities are created by the trusted computing base (TCB), a hardware component of INTEL SGX security architecture. INTEL SGX provides instructions to create REPORT, a signed structure which includes enclave identities, user data and other additional enclave attributes, for the attestation process. The user data field in the REPORT contains binding information of enclave identities and data inside the enclaves and additional information, e.g., public Diffie-Hellman keys to form a secure channel between the enclave and another enclave. INTEL SGX provides two attestation mechanisms: intra-platform (local) enclave attestation and inter-platform (remote) attestation. In local attestation, the REPORT is signed by a symmetric key. In remote attestation, INTEL SGX provides a special enclave called a quoting enclave. The quoting enclave verifies REPORT and then creates a QUOTE and signs it with asymmetric key. The signed QUOTE is sent to verifying enclave. The verifying enclave needs to communicate with a trusted third party, e.g., INTEL Attestation Service (IAS) to verify this QUOTE.

In an embodiment, the present invention provides a method for detecting a microarchitectural attack on a trusted execution environment and/or a violation of an expected execution flow of an application running in the trusted execution environment. The method includes, in a step a), implementing a counting thread that increments a counter variable at each cycle of a central processing unit on which the trusted execution environment is running. In a step b), an eviction set is loaded in a transaction. The eviction set corresponds to a cache set used by an operation of the application running in the trusted execution environment such that a transactional abort is received upon the operation being executed. In a step c), a value of the counting thread is read upon receiving the transactional abort. In a step d), steps b) and c) are repeated for a next operation of the application running in the trusted execution environment. In a step e), an execution time is measured for the operation based on a difference between the values of the counting thread. In a step f), the measured execution time for the operation is compared with an expected execution time to detect one or more variations that indicate the microarchitectural attack and/or the violation of the expected execution flow of the application.

In an embodiment, steps b)-f) are repeated for each operation of the application, and the method further comprises generating a report which indicates each operation of the application running in the trusted execution environment to be monitored for which the measured execution time deviated from the expected execution time by any amount or more than a predetermined threshold.

In an embodiment, the method is implemented in a further (e.g., assistant) trusted execution environment running on the same central processing unit and managed by a same operating system, wherein the trusted execution environments each have access to shared level 3 (L3) cache.

In an embodiment, the operating system is configured to assign the trusted execution environments to different cores of the central processing unit, and the method further comprises labelling the operating system as malicious in a case the operating system does not assign the assign the trusted execution environments to different cores of the central processing unit.

In an embodiment, the assistant trusted execution environment generates and stores reports indicating which operations of the application running in the trusted execution environment had measured execution times exceeding corresponding expected execution times by any amount or more than a predetermined threshold.

In an embodiment, the assistant trusted execution environment is initialized with an ephemeral key that is known to the trusted execution environment and changes upon each restart.

In an embodiment, the method further comprises profiling execution of the application running in the trusted execution environment so as to determine the expected execution flow of the operations in the application and the expected execution time for the operations.

In an embodiment, the cache sets corresponding to the operations are determined in the profiling, and the method further comprises building the eviction sets for the cache sets.

In an embodiment, steps b)-f) are repeated for each operation of the application or one or more code section of the application to be monitored, and the method further comprises determining whether consecutive ones of the operations have the measured execution time that deviates from the expected execution time by any amount or more than a predetermined threshold, and triggering an alarm in a case that the consecutive ones of the operations have the measured execution time that deviates from the expected execution time by any amount or more than a predetermined threshold.

In an embodiment, the method further comprises preparing a transaction for a different operation of the application running in the trusted execution environment, receiving a transactional abort for the different operation that is not expected based on an expected execution flow of the application and a previous operation of the application for which a previous transactional abort was received or not receiving a transaction abort for an operation that was expected based on the expected execution flow, and determining that the expected execution flow of the application has been violated based thereon.

In another embodiment, the present invention provides a system for detecting a microarchitectural attack on a trusted execution environment and/or a violation of an expected execution flow of an application running in the trusted execution environment. The system is implemented in a further trusted execution environment running on a same host as the trusted execution environment. The system comprises one or more processors which, alone or in combination, are configured to facilitate execution of the following steps: a) implementing a counting thread that increments a counter variable at each cycle of a central processing unit on which the trusted execution environment is running; b) loading an eviction set in a transaction, wherein the eviction set corresponds to a cache set used by an operation of the application running in the trusted execution environment such that a transactional abort is received upon the operation being executed; c) reading a value of the counting thread upon receiving the transactional abort; d) repeating steps b) and c) for a next operation of the application running in the trusted execution environment; e) measuring an execution time for the operation based on a difference between the values of the counting thread; and f) comparing the measured execution time for the operation with an expected execution time to detect one or more variations that indicate the microarchitectural attack and/or the violation of the expected execution flow of the application.

In an embodiment, the system is configured to repeat steps b)-f) for each operation of the application, and to generate a report which indicates each operation of the application running in the trusted execution environment to be monitored for which the measured execution time deviated from the expected execution time by any amount or more than a predetermined threshold.

In an embodiment, the system is configured to profile execution of the application running in the trusted execution environment so as to determine the expected execution flow of the operations in the application, the expected execution time for the operations and the cache sets corresponding to the operations, and wherein the system is configured to build the eviction sets for the cache sets.

In an embodiment, the system is configured to determine that the expected execution flow of the application has been violated based on receiving a transactional abort corresponding to an operation which was not expected based on the expected execution flow, or based on not receiving a transaction abort for an operation that was expected based on the expected execution flow.

In a further embodiment, the present invention provides a tangible, non-transitory computer-readable medium having instructions thereon which, upon being executed by one or more processors, alone or in combination, facilitate execution of a method for detecting a microarchitectural attack on a trusted execution environment and/or a violation of an expected execution flow of an application running in the trusted execution environment according to any embodiment of the present invention.

FIG. 1 schematically illustrates an architecture and model of a system 10 for securing a client enclave 12 using an assistant enclave 14 according to an embodiment of the present invention. Although the term enclave is used in FIG. 1 as an example in the context of SGX, it is to be understood that embodiments of the present invention are applicable to any TEE and that the terms TEE and enclave can be used interchangeably. Both the client enclave 12 and the assistant enclave 14 run on a host and are managed by a potentially malicious OS 15. The client enclave 12 and the assistant enclave 14 each have access to per-core level 1 (L1) and level (L2) caches and system-wide L3 cache, and the host (the processor or CPU) has a transactional memory mechanism enabled, such as INTEL Transactional Synchronization Extensions (TSX). Some processors may require the enclaves 12, 14 to run on different cores, otherwise the processor will abort immediately all the transactions. Therefore, an embodiment of the invention requests to the potentially malicious OS 15 to allocate both enclaves 12, 14 on different cores 18 and automatically label the OS 15 as malicious if it does not fulfill the request.

Thus, the system 10 includes software components 11 interacting with hardware components 16. The system 10 may be and/or include one or more computing devices such as computing platforms, systems, servers, desktops, laptops, tablets, mobile devices (e.g., smartphone device, or other mobile device), or any other type of computing device that generally comprises one or more processing components and one or more memory components. The hardware components 16 may be and/or include one or more processors such as a central processing unit (CPU), controller, module, and so on. Each processor may include one or more processing cores 18 (e.g., Core1, Core2, Core3, or Core4) and associated cache memory (e.g., caches). For instance, each core (e.g., Core1) may have dedicated caches (e.g., an L1 cache and an L2 cache) that are capable of storing data including temporary data for the individual core. Further, the hardware components 16 include a shared L3 cache that is capable of storing data for any of the cores (e.g., Core1 through Core4) for the particular hardware components 16 (e.g., including the one or more processors). As shown, cache memories are physical storage locations for storing the data and may be separate from the main memory of the system 10.

The software components 11 includes the OS 15 that manages and schedules the execution of applications and/or enclaves 12, 14 in which the applications are running. For example, the OS 15 may determine that Core1 and Core3 are available (e.g., not executing another application) and may use a scheduler to assign Core1 to execute one application and assign Core3 to execute another application. During execution, Core1 and Core3 have access to their respective L1/L2 caches as well as the shared L3 cache. For example, during the execution, Core1 and Core3 may store data into the L1, L2, and L3 caches as well as access this data at a later time. The time that is used for the cores 18 to access the stored data is unable to be manipulated by the potentially malicious OS 15 as it depends on the hardware itself. For example, the potentially malicious OS 15 may be able to delay or speed up retrieval of data from the main memory of the system 10. However, since the caches are part of the CPU (hardware components 16), the OS 15 is unable to influence or manipulate the time used by the cores 18 to actually access the cache data. In other words, the time required to obtain the data depends on whether it is cached or not. If it is in the cache, the access time is faster and the OS 15 is unable to change this.

Figure 2:
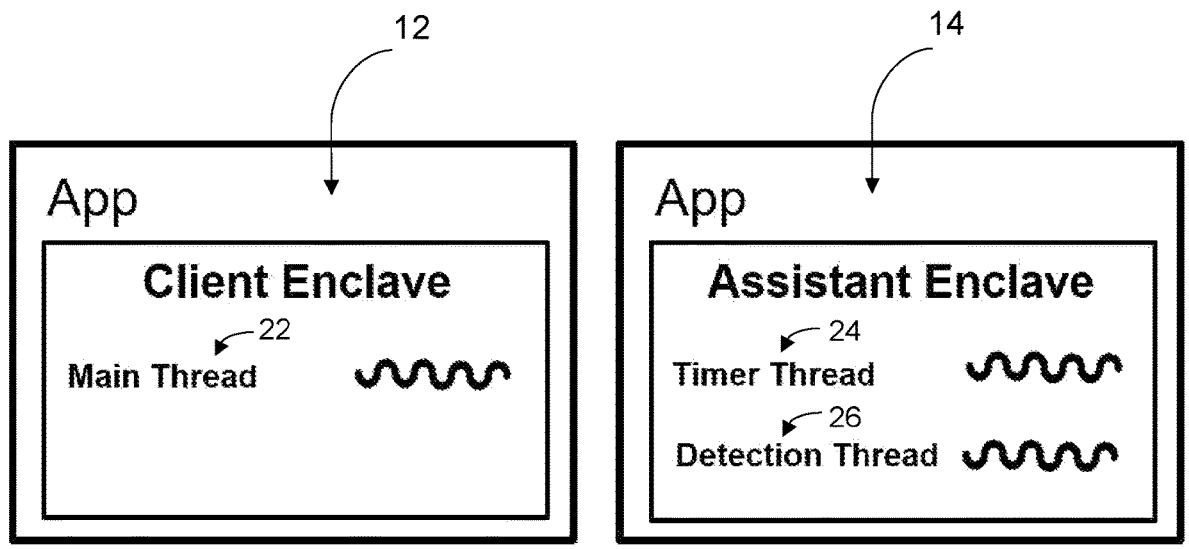
FIG. 2 schematically illustrates the internal structures of a client enclave and an assistant enclave according to an embodiment of the present invention.

FIG. 2 schematically illustrates the internal structure of the client enclave 12 and the assistant enclave 14. The client enclave 12 can be any type of TEE and can execute the main thread 22 of any application. In other words, the client enclave 12 can operate like any conventional TEE for any application. In contrast, the assistant enclave 14 is specially adapted according to embodiments of the present invention to include an auxiliary thread 24 in addition to the detection thread 26 that is in charge of measuring and analyzing the execution of the client enclave 12. The auxiliary thread 24 acts as a timer, and the detection thread 26 performs the detection tasks. The detection thread 26 uses the timer to measure the time it takes the client enclave 12 to execute each of the operations and then compares the measurement with the expected times in order to determine whether the client enclave is being subject to a microarchitectural attack and what information the attacker might have.

In order to get the expected execution times, the assistant enclave 14 either profiles the execution of the client enclave 12 beforehand or obtains this information and information about the expected execution flow of the client enclave 12 by other means. For example, the client enclave 12 can be adapted by code to measure its own execution times and to send this information to the assistant enclave 14. Other than obtaining this information, which can be done prior to actual execution, the assistant enclave 14 advantageously does not slow down or interfere with the execution of the client enclave 12. This is in contrast to existing approaches for detecting attacks on a TEE. According to an embodiment of the present invention, the client enclave 12 informs the assistant enclave 14 that it is going to run, and expects a report sent by the assistant once it has finished. Any attempt to interrupt or impede this communication is a sign of a malicious behavior.

During the profiling phase, the assistant enclave 14 preferably executes the client enclave 12 to collect information about the expected execution time of each part of the overall code or the parts that need or are going to be monitored in absence of any other processes. These times are stored by the assistant enclave 14 and use for the posterior comparison. Although evicting some data from cache sets which will be accessed by the client enclave 12 will have a minimal effect on its execution time, this is significantly less than interrupting its execution as in other existing approaches. Preferably, the assistant enclave 14 profiles the client enclave 12 so this time is already taken into account, for example by determining the time difference in a case where data in a cache set has been evicted. If the client enclave 12 is the one providing this expected execution time information, then a small $\Delta t$ representing the minimal effect of the data eviction could be included. In the case that the code of the client enclave 12 is modified to run the protected application (or the parts to be protected), measure its own execution times and provide these execution times to the assistant enclave 14 beforehand, then this modified part of the code is preferably removed before normal execution of the protected application in the client enclave 12.

Once the expected execution times are obtained by the profiling phase, the procedure proceeds as follows:

1. The client enclave 12 establishes an authenticated session with the assistant by leveraging, for example, local attestation mechanisms.
2. The assistant enclave 14 initiates the monitoring phase and preferably sends an acknowledgement ACK.
3. The client enclave 12 then executes normally. Before the execution can be considered as "finished" it receives the report.
4. The assistant enclave 14 detects the end of the execution of the client and sends the report through the aforementioned channel. If an attack is detected before the end of the execution of the client, the report or an additional report can be sent when the attack has been detected.

The timer thread 24 is a simple process that continuously increments a shared variable C. As a result, the value of C increments by one at each CPU cycle. Any other process with access to C can measure the CPU cycles required to complete a specific operation OP. In particular, the detection thread reads C every time it gets an abort: the difference between the two values returned by reading C determines the number of CPU cycles that the client took to perform OP.

The detection thread 26 is in charge of observing the execution of the client enclave 12, measuring the time it takes the client enclave 12 to execute each segment of the application and finally determining in which segment (if any) an attacker could have gained information. The detection thread 26 relies on the transactional memory to get notifications of the exact instants when the client enclave 12 executes each operation. The detection thread 26 also fills the cache set that the operation of the client enclave 12 is going to use beforehand. Cache memories in modern processors are divided into "sets" and each set can allocate up to N "lines". Any data read or written to memory is placed in the cache at a specific set, and this set is determined by the memory address of the data. Therefore, each instruction executed by the client enclave 12 will be cached at a fixed set.

Detection can advantageously occur automatically through the detection thread 26, which can be instrumented according to an embodiment of the present invention in accordance with the following pseudocode:

List_op = list of operations executed by the client {op1, op2, ...,opN}
List_set = list of the sets numbers to which each operation maps -continued

```
{s1,s2,...,sN}
List_times = list of expected execution times.
Report_times = { }
Initial_time = C (timing thread counter variable)
For each operation opi in List_op:
    Start transaction:
        Read set si and wait
    When ABORT signal is received:
        Exec time(i-1) = Current C - Initial_time
        Initial_time = C
        If (i>0)
            Append (exec_time(i-1) - expected_time(i-1)) to Report.
```

Since the assistant enclave 14 knows the operations that the client enclave 12 is going to execute, verifying the correspondence between cache sets and operations can be relatively easily achieved by starting a transaction and triggering an operation of the client enclave 12. If the operation maps to the same cache set included inside the transaction then there is an abort, otherwise there is not. Once the correspondence of one of the cache sets' operation is known, computing the others can be relatively easily achieved by adding an offset since memory is normally linearly allocated inside enclaves. This could be part of the profiling phase, for example, so both expected execution times and correspondences between operations and cache sets are stored in the assistant enclave 14 prior to the monitoring phase.

Figure 3:
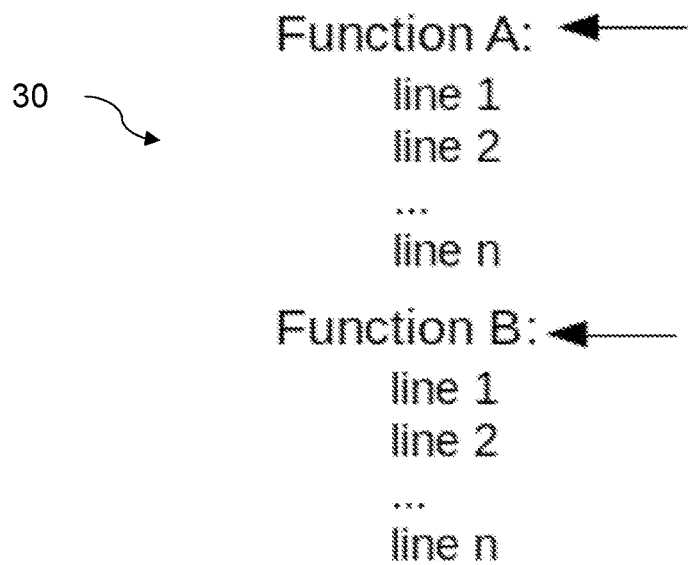
FIG. 3 shows an example program to be run on the client enclave.

FIG. 3 depicts a sample program 30 that will run in the client enclave 12. In this example, function A will be cached in one set Sa and function B will be cached in a different set Sb. The assistant enclave 14 is programmed so it can receive or retrieve the information about which are the set numbers of cache sets Sa and Sb to be able to distinguish whether function A or function B was executed. Caching is automatically done by the CPU, so the assistant enclave 14 either receives such information from the client enclave 12 or the assistant enclave 14 profiles the client enclave 12 by executing the client enclave 12 and thereby determining the mapping between the client operations, or functions, and the cache sets. Once the assistant enclave 14 knows the locations of the cache sets Sa and Sb, it can build two different eviction sets (groups of addresses that map to a particular cache set and) completely fill them. Liu, Fangfei, et al., "Last-Level Cache Side-Channel Attacks are Practical," In Proceedings of the 2015 IEEE Symposium on Security and Privacy (SP '15), San Jose, Calif., USA, pp. 605-622 (Jul. 17, 2015), which is hereby incorporated by reference herein, describe one possible way of building these eviction sets, as well as standard techniques for identifying the corresponding cache sets. If more than two functions are going to be monitored, one eviction set is built for each function monitored. As discussed above, the detection thread 26 knows the expected execution flow of the client enclave 12, and the time it takes to execute each segment of the program. As an example, the program executes the sequence of functions A,A,B,A,B,A, wherein function A takes Ta cycles to execute and function B takes Tb cycles to execute. The assistant enclave 14 will load in a transaction the eviction set corresponding to Sa and it will get an abort as soon as the client enclave 12 executes function A. Once the assistant enclave 14 gets the abort, it stores the value of the timer counter collected from the timer thread 24. Next, the assistant enclave 14 will load in a transaction the eviction set corresponding to Sb, and it will get an abort as soon as the client enclave 12 executes function B. Again, the value of the timer thread 24 is stored, whereby the current time minus the previous stored time should be equal to 2*Ta cycles, since function A was executed twice (see the example sequence above where A is executed twice before B is executed). This procedure is repeated continuously until the program has finished. Finally, the assistant enclave 14 generates a report with the measured times for each function and their deviation from the expected times.

Preferably, the next time the client enclave 12 executes the program, the previous reports are taken into account. The assistant enclave 14 can use the reports to determine which functions of the program out of the total number of functions have leaked information and, for example, informs to the client enclave 12 about the percentage leaked. In order to prevent other kind of attacks, such as rollback attacks, that may try to change the information referring to previous executions of the client enclave 12, the assistant enclave 14 is initialized with an ephemeral key that changes every time it is restarted. Such key is known by the enclave owner and by the client enclave 12 and both can verify it has not changed. The assistant enclave 14 keeps on its runtime memory the information about the client enclave 12 and just seals it if requested by a trusted party. Since it does not have to be stopped, any change on its ephemeral key will be highly suspicious.

It has been empirically verified that transactions abort as soon as the data is removed from the cache, therefore the timing measurements that can be obtained this way are highly reliable. Variations in the times measured are likely due to other processes interfering with the client enclave 12.

In the following, the operations carried out by the detection thread 26 are discussed in further detail. In a setup phase, the assistant enclave 14 is configured by code to perform the operations that the assistant enclave 14 has to perform before it can actually start to monitor the execution of the client enclave 12. At this stage, the assistant enclave 14 is programmed to:

1. Get information about the functions that need to be monitored, the execution flow and the anticipated or expected execution times.
2. Build the eviction sets for the desired functions.

The information about the functions that need to be monitored, the execution flow and the anticipated or expected execution times can be determined by analyzing the source code of the client enclave 12. In particular, the analysis can include:

1. Determining from the source code the virtual addresses of each of the functions. This later translates into adding offsets to the sets, for example, if virtual address a maps to set 1, then virtual address a+N would map to set 1+N/L where L is the cache line size and linear memory is assumed or measured). Also, it is possible to estimate the execution flow by analyzing how functions are executed (e.g., the order of the functions).
2. Running the client enclave while monitoring and measuring each of the functions with the proposed detection tool. The times are then saved and used as reference for future executions.

Alternatively or additionally, the client enclave 12 itself can give this information about the functions that need to be monitored, the execution flow and the anticipated or expected execution times directly to the assistant enclave 14 as discussed above.

As also discussed above, the data of the eviction sets is read within the transaction for the assistant enclave 14 to automatically get the aborts that notify that the client enclave 12 is using the corresponding function. For example, Algorithm 1 in Liu, Fangfei, et al., "Last-Level Cache Side-Channel Attacks are Practical," In Proceedings of the 2015 IEEE Symposium on Security and Privacy (SP '15), San Jose, Calif., USA, pp. 605-622 (Jul. 17, 2015) can be used for building the eviction sets and is set forth below.

---
Algorithm 1: Creating the eviction sets
---
```
input: a set of potentially conflicting memory lines lines
output: a set of eviction sets for lines, one eviction set for each slice
Function probe(set, candidate) begin
    read candidate;
    foreach l in set do
        read l;
    end
    measure time to read candidate;
    return time > threshold;
end
randomize lines;
conflict_set←{ };
foreach candidate ∈ lines do
    if not probe(conflict_set, candidate) then
        insert candidate into conflict_set;
    end
foreach candidate in lines-conflict_set do
    if probe(conflict_set, candidate) then
        eviction_set←{ };
        foreach l in conflict_set do
            if not probe(conflict_set -{l}, candidate) then
                insert l into eviction_set;
            end
        output eviction_set;
        conflict_set←conflict_set-eviction_set;
    end
end
```
---

When executed inside an enclave, the algorithm can be modified to improve its performance, but in any case the procedure can be as follows:
1. Book a big enough memory region (at least twice the cache size).
2. Pick a test address and repeat the following steps until the data is evicted from the cache:
   a. Read test_address,
   b. Read N blocks of data from the booked region.
   c. Measure access time to test_address. If it is still in the cache (low access time), N=N+1 else move to step 3 below.
3. Remove elements from the group of N until it has the size of the cache set ensuring it is able to remove test_address. For example, equivalently to the previous steps, the following steps can be performed while (N>Cache set size):
   a. Read test_address.
   b. Remove one block of data from the group of N and access the N-1 remaining blocks
   c. Measure access time to test_address, if it is not in the cache (high access time), the removed block does not belong to the eviction set so N=N-1, else the block must be placed back again into the list and N remains unchanged.

Figure 4:
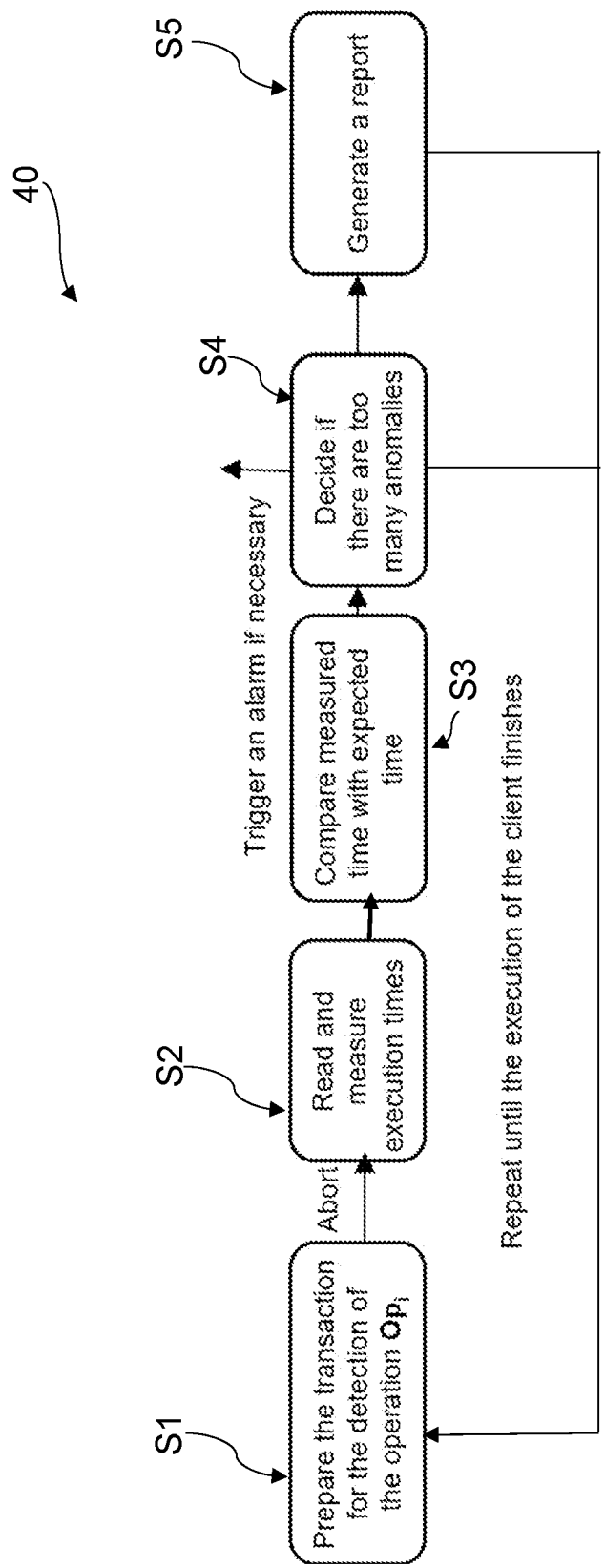
FIG. 4 schematically illustrates a method for detecting a microarchitectural attack according to an embodiment of the present invention.

FIG. 4 schematically illustrates a detection phase 40 of the detection thread. In the detection phase 40, the assistant enclave 14 runs in parallel with the client enclave 12. The client enclave 12 notifies the assistant enclave 14 that it is going to execute and it expects a report back at the end of each execution. In order to do this, preferably the code of the client enclave 12 can be instrumented to include a function to communicate with the assistant enclave 14 as discussed above. Otherwise, the assistant enclave 14 would have to monitor the entry points of the client and the report could be obtained by other means. For example, an authenticated third party like the client enclave developer could query the assistant enclave 14. If this report is not received in a case that the client enclave 12 is instrumented to expect it, then the client enclave 12 automatically assumes it is under attack. The detection phase 40 includes two stages:
1. During the execution of the client enclave 14, the detection thread 26 loops over each operation $Op_i$ that is part of the expected execution flow, and for each operation $Op_i$, the detection thread 26 executes the following steps:
   a. Prepares a transaction and reads the contents of the eviction set corresponding to the following operation $Op_{i+1}$ within the transaction (see step S1). The transaction can be prepared by calling one function. For example, in the case of processors from the company INTEL, the function Xbegin( ) can be called, and the data of the corresponding eviction set for the operation $Op_i$ can then be read.
   b. Reads variable C as soon as the transaction aborts for measuring the execution time of the operation $Op_i$ (see step S2).
   c. Computes the execution time as the difference between the value just read at step S2 and the value read at step S2 of the previous loop iteration, and stores this value (see step S3).
   d. Compares the measured time with the expected one, and stores the cumulative difference or a difference which takes into account previous executions of the client (e.g., enabling to determine if the attacker has leaked part of the information on previous executions). Preferably, in case various consecutive operations misbehave (e.g., by having measured times that differ from the expected ones by more than an amount which accounts for normal variations), the client enclave could be notified by an alarm that it is likely suffering an attack without having to wait until it has finished its execution (see step S4). The deviation from which it is determined that an operation is misbehaving can depend on the type of attack. For example, for a cache attack the deviation would be approximately the cache miss time. Similarly, for a TLB-based attack, the deviation could be that of a TLB miss. Both are dependent on the underlying hardware.
2. Once the execution of the client enclave 12 has finished, if no alarm has been triggered, the detection thread 26 compares the execution times collected at step S2 with the expected ones (see step S3). For each operation, if the time difference for operation $Op_i$ is greater than T, where T is the minimum overhead that the stealthiest attacker has to introduce to gain information from $Op_i$, then append to report "leakage at operation $Op_i$"; otherwise append "no leakage at operation $Op_i$".

The report can include total measured execution times, individual ones and individual and cumulative differences, among other possible measurements. The determination of misbehaving functions can be based on any variation from the expected execution times or a deviation or threshold therefrom which can be application dependent. This can be set based upon a request of the client enclave 12 or depending on the configuration of the assistant enclave 14. For example, the assistant enclave 14 could report all the variations and also a warning message indicating which ones are above the threshold (e.g., the time for a cache miss).

Embodiments of the present invention further provide for the detection of execution flow violations. In the same way that transactional memory and the expected execution flow can be leveraged to detect timing variations in the execution of each of the functions, this detection approach can be adapted to determine whether there has been a violation of the execution flow or if some data has been accessed at an unexpected instant. In particular, the client enclave 12 can hint to the assistant enclave 14 that between the execution of functions A and B it is never possible to execute a third function C, otherwise this would mean the client is suffering an attack (not necessarily a microarchitectural attack). In this scenario, just after the execution of function A is detected, the assistant enclave 14 would start two transactions, one for the detection of B and a second one for the detection of C. If C is detected before B, this automatically indicates a violation of the execution flow. Otherwise, the execution flow was respected. In a similar manner, the assistant enclave 14 can detect whether an expected operation has not been executed.

Information from the client enclave 12 about the execution times can be provided by the assistant enclave 14 exposing an interface so the programmer of the client enclave 12 can send this information through the interface. In this scenario, the client enclave 12 does not need to include extra code, nor perform any additional steps. If the client enclave 12 needs to update this information during its lifetime, then it can include a function to communicate with the assistant enclave 14. It is also possible that the assistant enclave 14 would analyze the client code and decide which possible violations of the execution flow could be dangerous.

Once the information on the execution times is known to the assistant enclave 14, and using the example where B must be executed after A, and C should not execute before B, it can be determined that there is a dangerous violation of the execution flow in a case that the transactional abort is received for C when it was expected for B, or if no transactional abort is received for B. Preferably, both transactions are prepared as soon as the execution of A is detected. They can be prepared before the execution of the application if they are executed once each time the application is called and if the time required to complete all the operations of the application is below certain limit (this can depend on the processor, but it is in the order of several hundreds of milliseconds). The reason for this is that spontaneous aborts are more likely to happen after that time. If these conditions are not fulfilled then, as indicated above, the transactions can be prepared as soon as the preceding operation has been detected.

Embodiments of the present invention provide for the following improvements:
1. Accurate monitoring of the sequence of operations executed by a client enclave 12 from an assistant enclave 14 that leverages transactional memory creating transactional conflicts with these operations to accurately measure them, and then compares the measured times with the expected ones to generate a leakage report and detect microarchitectural attacks.
2. Verifying if the execution flow of the client enclave program is the one that was expected or if, on the contrary, it has executed unintended functions or accessed unintended memory locations such that misbehavior or other attacks are detected.

In an embodiment, the present invention provides a method for detecting microarchitectural attacks against TEEs and/or violations of an expected execution flow of the TEE program which may be indicative of an attack, the method comprising the steps of:
1. Implementing a counting thread that increments a counter variable at each CPU cycle.
2. Getting information about the expected execution flow of a TEE's program and its corresponding execution times.
3. Building the eviction sets for detecting the execution of the client by means of transactional aborts.
4. Using the secondary counting thread to measure execution times between consecutive aborts.
5. Comparing the information referring to the execution of the step 2. with the collected during the step 4. to detect variations that indicate attacks and generate a report.

Embodiments of the present invention advantageously allow not only to detect the micro-architectural attacks that other countermeasures do, without interrupting execution of the program and using less computational resources, but also enables an TEE to detect if it is being the victim of a fragmented attack that tries to infer small pieces of information from each execution of the victim. Further, it allows to verify violations of the execution flow of the client TEE/enclave at significantly less computational resources and overhead as existing approaches that monitor the enclave program from the enclave itself.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for detecting a microarchitectural attack on a trusted execution environment and/or a violation of an expected execution flow of an application running in the trusted execution environment, the method comprising:
   a) implementing a counting thread that increments a counter variable at each cycle of a central processing unit on which the trusted execution environment is running;

b) loading an eviction set in a transaction, wherein the eviction set corresponds to a cache set used by an operation of the application running in the trusted execution environment such that a transactional abort is received upon the operation being executed;

c) reading a value of the counting thread upon receiving the transactional abort;

d) repeating steps b) and c) for a next operation of the application running in the trusted execution environment;

e) measuring an execution time for the operation based on a difference between the values of the counting thread; and f) comparing the measured execution time for the operation with an expected execution time to detect one or more variations that indicate the microarchitectural attack and/or the violation of the expected execution flow of the application.

2. The method according to claim 1, wherein steps b)-f) are repeated for each operation of the application, the method further comprising generating a report which indicates each operation of the application running in the trusted execution environment to be monitored for which the measured execution time deviated from the expected execution time by any amount or more than a predetermined threshold.

3. The method according to claim 1, wherein the method is implemented in a further trusted execution environment running on the same central processing unit and managed by a same operating system, and wherein the trusted execution environments each have access to shared level 3 (L3) cache.

4. The method according to claim 3, wherein the operating system is configured to assign the trusted execution environments to different cores of the central processing unit, the method further comprising labelling the operating system as malicious in a case the operating system does not assign the trusted execution environments to different cores of the central processing unit.

5. The method according to claim 3, wherein the further trusted execution environment generates and stores reports indicating which operations of the application running in the trusted execution environment had measured execution times exceeding corresponding expected execution times by any amount or more than a predetermined threshold.

6. The method according to claim 5, wherein the further trusted execution environment is initialized with an ephemeral key that is known to the trusted execution environment and changes upon each restart.

7. The method according to claim 1, further comprising profiling execution of the application running in the trusted execution environment so as to determine the expected execution flow of the operations in the application and the expected execution time for the operations.

8. The method according to claim 7, wherein the cache sets corresponding to the operations are determined in the profiling, the method further comprising building the eviction sets for the cache sets.

9. The method according to claim 1, wherein steps b)-f) are repeated for each operation of the application or one or more code section of the application to be monitored, the method further comprising determining whether consecutive ones of the operations have the measured execution time that deviates from the expected execution time by any amount or more than a predetermined threshold, and triggering an alarm in a case that the consecutive ones of the operations have the measured execution time that deviates from the expected execution time by any amount or more than a predetermined threshold.

10. The method according to claim 1, further comprising preparing a transaction for a different operation of the application running in the trusted execution environment, receiving a transactional abort for the different operation that is not expected based on an expected execution flow of the application and a previous operation of the application for which a previous transactional abort was received or not receiving a transaction abort for an operation that was expected based on the expected execution flow, and determining that the expected execution flow of the application has been violated based thereon.

11. A system for detecting a microarchitectural attack on a trusted execution environment and/or a violation of an expected execution flow of an application running in the trusted execution environment, the system being implemented in a further trusted execution environment running on a same host as the trusted execution environment, the system comprising one or more processors which, alone or in combination, are configured to facilitate execution of the following steps:

a) implementing a counting thread that increments a counter variable at each cycle of a central processing unit on which the trusted execution environment is running;

b) loading an eviction set in a transaction, wherein the eviction set corresponds to a cache set used by an operation of the application running in the trusted execution environment such that a transactional abort is received upon the operation being executed;

c) reading a value of the counting thread upon receiving the transactional abort;

d) repeating steps b) and c) for a next operation of the application running in the trusted execution environment;

e) measuring an execution time for the operation based on a difference between the values of the counting thread; and f) comparing the measured execution time for the operation with an expected execution time to detect one or more variations that indicate the microarchitectural attack and/or the violation of the expected execution flow of the application.

12. The system according to claim 11, wherein the system is configured to repeat steps b)-f) for each operation of the application, and to generate a report which indicates each operation of the application running in the trusted execution environment to be monitored for which the measured execution time deviated from the expected execution time by any amount or more than a predetermined threshold.

13. The system according to claim 11, wherein the system is configured to profile execution of the application running in the trusted execution environment so as to determine the expected execution flow of the operations in the application, the expected execution time for the operations and the cache sets corresponding to the operations, and wherein the system is configured to build the eviction sets for the cache sets.

14. The system according to claim 13, wherein the system is configured to determine that the expected execution flow of the application has been violated based on receiving a transactional abort corresponding to an operation which was not expected based on the expected execution flow, or based on not receiving a transaction abort for an operation that was expected based on the expected execution flow.

15. A tangible, non-transitory computer-readable medium having instructions thereon which, upon being executed by one or more processors, alone or in combination, facilitate execution of a method for detecting a microarchitectural attack on a trusted execution environment and/or a violation of an expected execution flow of an application running in the trusted execution environment comprising the following steps:
- a) implementing a counting thread that increments a counter variable at each cycle of a central processing unit on which the trusted execution environment is running;
- b) loading an eviction set in a transaction, wherein the eviction set corresponds to a cache set used by an operation of the application running in the trusted execution environment such that a transactional abort is received upon the operation being executed;
- c) reading a value of the counting thread upon receiving the transactional abort;
- d) repeating steps b) and c) for a next operation of the application running in the trusted execution environment;
- e) measuring an execution time for the operation based on a difference between the values of the counting thread; and
  - comparing the measured execution time for the operation with an expected execution time to detect one or more variations that indicate the microarchitectural attack and/or the violation of the expected execution flow of the application.

* * * * *